United States Patent
Hashigami et al.

(10) Patent No.: US 10,728,464 B2
(45) Date of Patent: Jul. 28, 2020

(54) IMAGING APPARATUS INCLUDING AUTO EXPOSURE CORRECTION

(71) Applicant: Panasonic Intellectual Property Management Co., Ltd., Osaka (JP)

(72) Inventors: Koji Hashigami, Nara (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/150,062

(22) Filed: Oct. 2, 2018

(65) Prior Publication Data

US 2019/0109971 A1    Apr. 11, 2019

(30) Foreign Application Priority Data

Oct. 6, 2017    (JP) ................. 2017-196370

(51) Int. Cl.
*H04N 5/235* (2006.01)
*H04N 5/232* (2006.01)

(52) U.S. Cl.
CPC ......... *H04N 5/2353* (2013.01); *H04N 5/2352* (2013.01); *H04N 5/23245* (2013.01)

(58) Field of Classification Search
None
See application file for complete search history.

(56) References Cited

U.S. PATENT DOCUMENTS

| | | | | |
|---|---|---|---|---|
| 4,005,444 A * | 1/1977 | Uchiyama | ............ | G03B 7/16 396/61 |
| 7,012,638 B1 * | 3/2006 | Yokonuma | ......... | H04N 5/23245 348/207.99 |
| 2008/0309776 A1 * | 12/2008 | Suzuki | .................. | H04N 5/232 348/220.1 |
| 2012/0301125 A1 * | 11/2012 | Ashida | .................. | G03B 13/36 396/95 |
| 2014/0184889 A1 * | 7/2014 | Wada | ................. | H04N 5/23212 348/353 |
| 2017/0171446 A1 * | 6/2017 | Nashizawa | ........ | H04N 5/35581 |
| 2019/0098192 A1 * | 3/2019 | Wright | ............... | H04N 5/23222 |

FOREIGN PATENT DOCUMENTS

JP      2006-106200 A    4/2006

* cited by examiner

*Primary Examiner* — Cynthia Segura
(74) *Attorney, Agent, or Firm* — Renner, Otto, Boisselle & Sklar, LLP (57) ABSTRACT

An imaging apparatus includes an imager, an operator, and a controller. The operator sets an exposure correction value and a continuous shooting mode including a first continuous shooting mode and a second continuous shooting mode in which continuous shooting is performed at a higher speed than in the first continuous shooting mode. The controller is configured to determine whether the exposure correction value is within a predetermined range when the second continuous shooting mode is set in the operator. The controller is configured to perform the auto exposure control during continuous shooting operation in the second continuous shooting mode when determined that the exposure correction value is within the predetermined range. The controller is configured not to perform the auto exposure control during the continuous shooting operation in the second continuous shooting mode when determined that the exposure correction value is not within the predetermined range.

3 Claims, 5 Drawing Sheets

IMAGING APPARATUS INCLUDING AUTO EXPOSURE CORRECTION

BACKGROUND

1. Technical Field

The present disclosure relates to an imaging apparatus having an auto exposure.

2. Related Art

Japanese Unexamined Patent Application Publication No. 2006-106200 discloses a camera including a multi-zone metering sensor that divides a subject field into a plurality of portions to measure the brightness of a subject, a storage unit that stores photometric data output from the multi-zone metering sensor, and a control unit that, in a continuous shooting mode in which a plurality of photos is continuously shot, divides pixels of the multi-zone metering sensor into a plurality of groups and exercises control such that all photometric data of the plurality of groups is acquired for a plurality of shots like acquiring photometric data of only one group from the storage unit for one shot and acquiring photometric data of a group different from the one group from the storage unit for next shot.

According to the configuration of the camera in Japanese Unexamined Patent Application Publication No. 2006-106200, cameras that do not increase the size of the metering system even if the number of pixels in the multi-zone metering sensor increases and do not affect continuous shooting can be provided.

SUMMARY

According to one aspect of the present disclosure, an imaging apparatus having an auto exposure function for automatically setting exposure includes an imager, an operator, and a controller. The imager shoots a subject with exposure set and to generate image data. The operator sets an exposure correction value to correct the exposure set by the auto exposure function and a continuous shooting mode including a first continuous shooting mode and a second continuous shooting mode in which continuous shooting is performed at a higher speed than in the first continuous shooting mode. The controller is configured to perform auto exposure control to implement the auto exposure function. The controller is configured to determine whether the exposure correction value is within a predetermined range when the second continuous shooting mode is set in the operator. The controller is configured to perform the auto exposure control during continuous shooting operation in the second continuous shooting mode when determined that the exposure correction value is within the predetermined range. The controller is configured not to perform the auto exposure control during the continuous shooting operation in the second continuous shooting mode when determined that the exposure correction value is not within the predetermined range.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment will be described in detail with reference to the drawings as appropriate. However, unnecessary detailed descriptions may be omitted. For example, detailed descriptions of already well-known matters or redundant descriptions of substantially the same configuration may be omitted. This is intended to avoid making the following description unnecessarily redundant and to facilitate understanding by those skilled in the art.

In addition, the inventor(s) provide the accompanying drawings and the following description in order to enable those skilled in the art to sufficiently understand the present disclosure and the subject matter described in claims is not intended to be thereby limited.

[1-1. Configuration]

Figure 1:
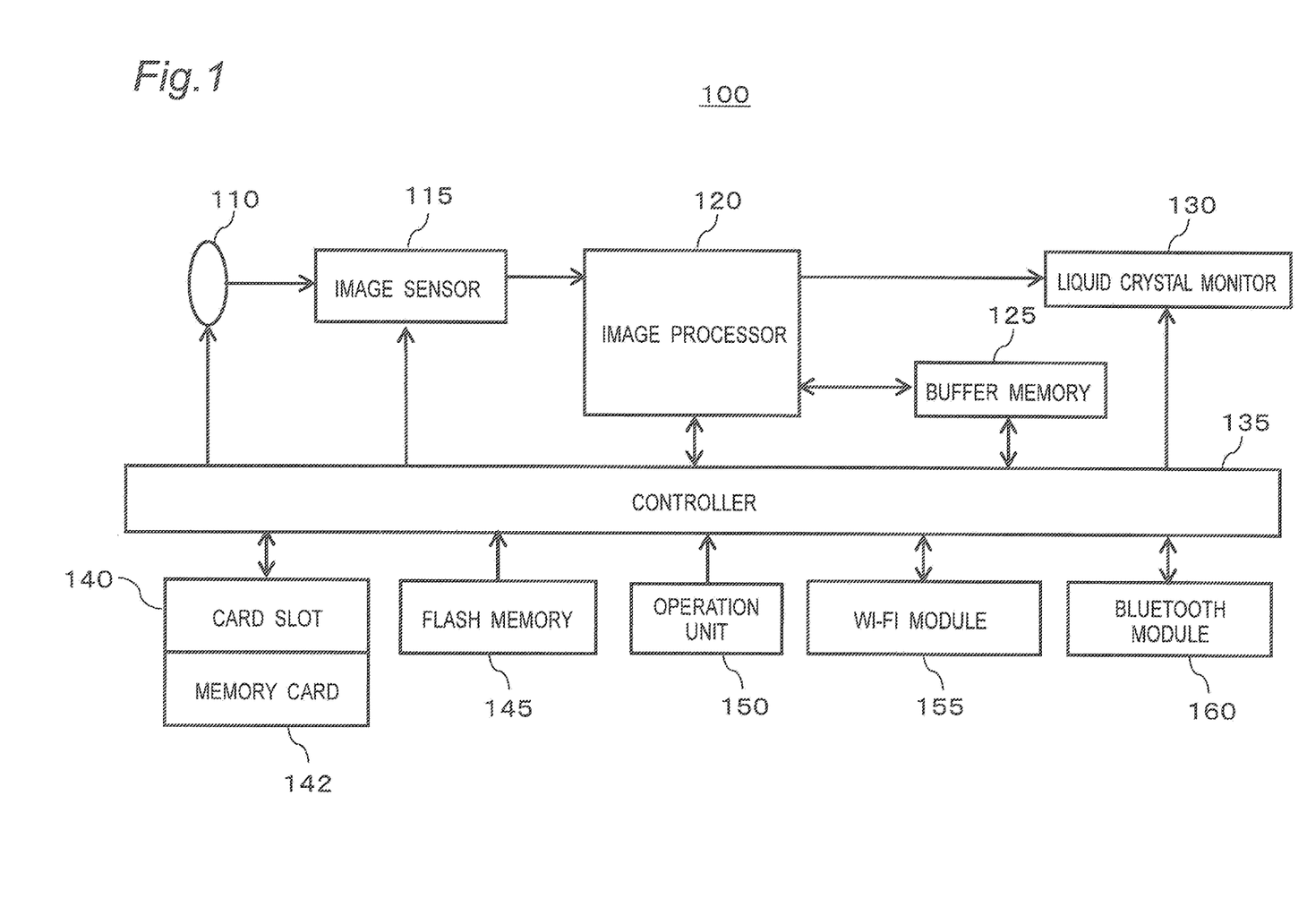
FIG. 1 is a diagram showing an electrical configuration of a digital camera according to an embodiment of an imaging apparatus of the present disclosure.

FIG. 1 is a diagram showing an electrical configuration of a digital camera according to an embodiment of an imaging apparatus of the present disclosure. A digital camera 100 captures a subject image formed via an optical system 110 with an image sensor 115. The image sensor 115 generates image data (RAW data) based on the captured subject image. An image processor 120 performs various kinds of processing on the image data generated by imaging. A controller 135 records the image data processed by the image processor 120 in a memory card 142 inserted into a card slot 140. In addition, the controller 135 can cause a liquid crystal monitor 130 to display (reproduce) the image data recorded in the memory card 142 according to the operation of an operation unit 150 by the user.

The optical system 110 includes a focus lens, a zoom lens, an optical image stabilizer (OIS), a diaphragm, a shutter and the like. Various lenses included in the optical system 110 may include any number of lenses or may include any number of groups.

The image sensor 115 generates image data by capturing a subject image formed via the optical system 110. The image sensor 115 generates image data at a predetermined frame rate (for example, 30 frames/s). The generation timing of imaging data and an electronic shutter operation in the image sensor 115 are controlled by the controller 135. Various image sensors such as a CMOS image sensor, a CCD image sensor, or an NMOS image sensor can be used as the image sensor 115.

The image processor 120 performs various kinds of processing on the image data output from the image sensor 115. Further, the image processor 120 performs various kinds of processing on the image data read from the memory card 142 to generate an image to be displayed on the liquid crystal monitor 130. Examples of various kinds of processing include white balance corrections, gamma corrections, YC conversion processing, electronic zoom processing, compression processing, decompression processing and the like, but are not limited thereto. The image processor 120 may be configured with a hardwired electronic circuit or may be configured with a microcomputer using a program or the like.

The liquid crystal monitor 130 is provided on the back side of the digital camera 100. The liquid crystal monitor 130 displays an image based on the image data processed by the image processor 120. Instead of the liquid crystal monitor, another monitor such as an organic EL monitor may be used.

The controller 135 includes a CPU, and executes a predetermined program (software) to perform centralized control of an operation of the entire digital camera 100. Further, the controller 135 may be configured with one semiconductor chip together with the image processor 120 or the like. Although not shown, the controller 135 contains a ROM. In addition to programs related to autofocus control (AF control), auto exposure control (AE control), and communication control executed by the CPU, programs to perform centralized control of the operation of the entire digital camera 100 are stored in the ROM. The controller 135 may be an electronic circuit tailored to implement a predetermined function. That is, the controller 135 can be implemented by various electronic circuits such as CPU, MPU, GPU, FPGA, DSP, ASIC and the like.

A buffer memory 125 is a recording medium that functions as a work memory of the image processor 120 and the controller 135. The buffer memory 125 is implemented by a dynamic random access memory (DRAM) or the like.

The card slot 140 is a unit for inserting the removable memory card 142. The card slot 140 is capable of electrically and mechanically connecting the memory card 142. The memory card 142 is an external memory having a recording element such as a flash memory therein. The memory card 142 can store data such as image data generated by the image processor 120.

A flash memory 145 is a nonvolatile recording medium. The flash memory 145 temporarily records a captured image.

The operation unit 150 is a generic name for hard keys such as operation buttons and operation levers provided on the exterior of the digital camera 100 and accepts operations by the user. The operation unit 150 includes, for example, a shutter button, a mode dial, an exposure correction dial, a drive mode dial, and/or a touch panel. The operation unit 150 also includes menus, buttons, and/or icons displayed on the liquid crystal monitor 130 operated via the touch panel. Upon receiving an operation by the user, the operation unit 150 transmits an operation signal corresponding to the user operation to the controller 135.

A Wi-Fi module 155 is a communication module (circuit) that performs communication conforming to the communication standard IEEE 802.11 or the Wi-Fi standard. The digital camera 100 can communicate with other devices equipped with a Wi-Fi module via the Wi-Fi module 155. The digital camera 100 may directly communicate with other devices via the Wi-Fi module 155, or may communicate via an access point. Note that instead of the Wi-Fi module, a communication module that performs communication conforming to another communication standard may be used.

A Bluetooth (registered trademark) module 160 is a module (circuit) for performing communication conforming to the communication standard IEEE 802.15.1, that is, the Bluetooth standard. The digital camera 100 can perform communication conforming to the Bluetooth standard with other devices via the Bluetooth module 160.

[1-2. Operation]

The operation of the digital camera 100 configured as described above during continuous shooting will be described below.

The digital camera 100 has an auto exposure (AE) function for automatically setting the exposure. In the auto exposure function, the brightness of an image (that is, a subject) is detected based on the image data generated at predetermined intervals by the image sensor 115, and a proper exposure amount (hereinafter, referred to as an "EV value") is determined based on the brightness. Then, the exposure (specifically, the diaphragm, shutter speed, and ISO sensitivity) is controlled based on the determined proper EV value. Thus, in the auto exposure function, a proper EV value is determined based on the brightness of an image (that is, a subject).

The exposure (EV value) determined by the auto exposure function of the digital camera 100 is not necessarily the exposure intended by the user. Therefore, the digital camera 100 has an exposure correction function that enables the user to adjust the exposure automatically determined by the camera. In the exposure correction, the exposure automatically determined by the camera is corrected according to the exposure correction value set by the user. In the present embodiment, the exposure correction value can be set in 11 steps from −5 EV to +5 EV, but the number of exposure correction steps is not limited thereto.

The digital camera 100 has a continuous shooting mode in which still images are continuously shot at predetermined time intervals while the shutter button is kept pressed by the user. As a continuous shooting mode, the digital camera 100 has a normal continuous shooting mode (an example of a first continuous shooting mode) in which continuous shooting is performed at a first speed and a high-speed continuous shooting mode (an example of a second continuous shooting mode) in which continuous shooting is performed at a second speed higher than the first speed. In the normal continuous shooting mode, for example, ten still images can be shot in one second, and in the high-speed continuous shooting mode, for example, sixty still images can be shot in one second. The normal continuous shooting mode and high-speed continuous shooting mode can be set using the drive mode dial.

Figures 2A, 2B:
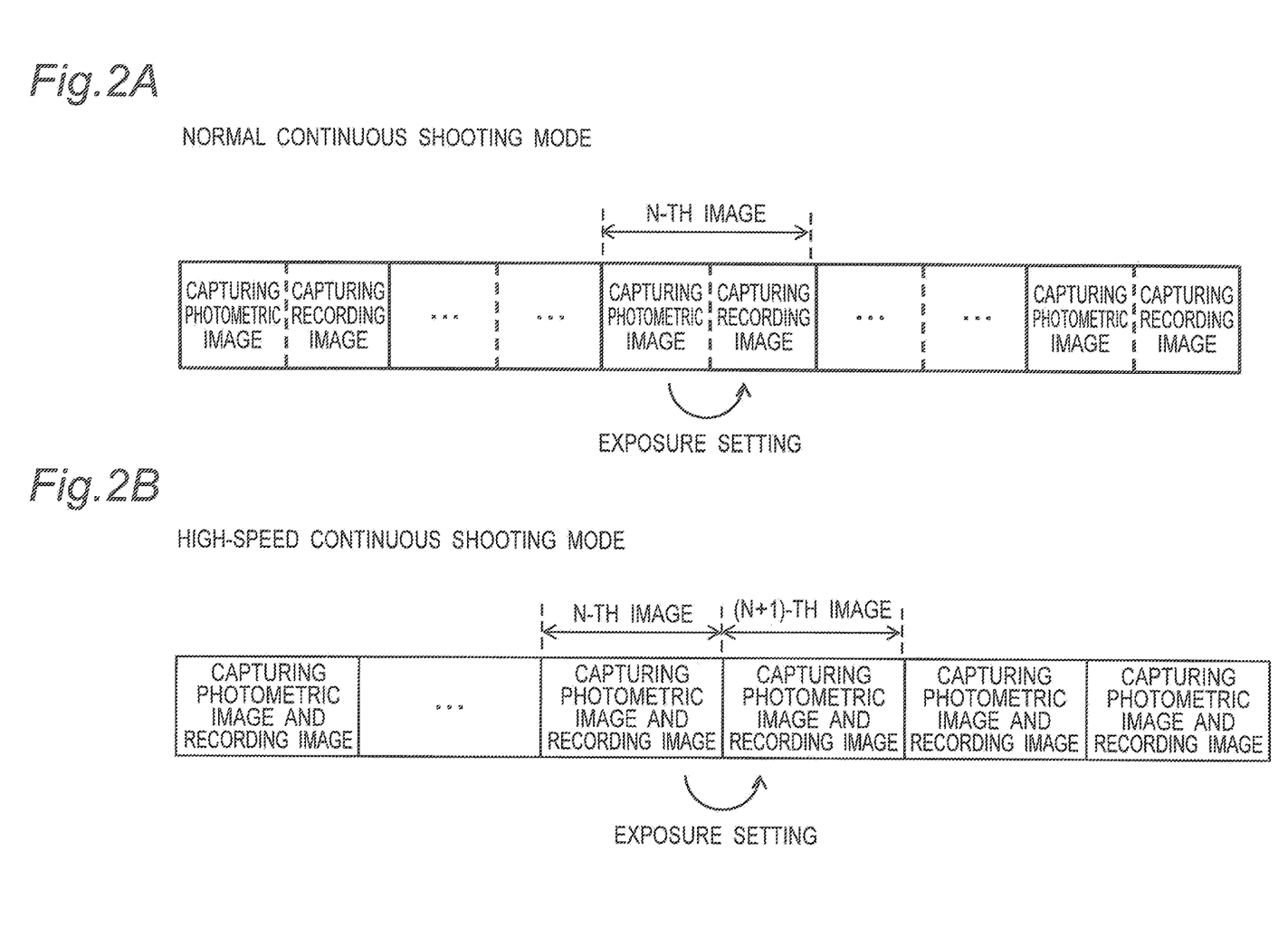
FIGS. 2A and 2B are diagrams each illustrating a difference in exposure operation between a normal continuous shooting mode and a high-speed continuous shooting mode in the digital camera according to a first embodiment.

FIGS. 2A and 2B are diagrams each illustrating image capturing executed when auto exposure control is performed in each of the normal continuous shooting mode and the high-speed continuous shooting mode in the digital camera 100.

In the normal continuous shooting mode, as shown in FIG. 2A, a photometric image and a recording image are captured for the N-th still image. The photometric image is an image used for detecting the brightness of an image (subject) and determining a proper EV value at the time of capturing the recording image. The recording image is an image finally recorded in the memory card 142. The photometric image for the N-th still image is used for determining the proper EV value of the recording image for the N-th still image. Thus, in the normal continuous shooting mode, image capturing is performed twice for one still image. In the normal continuous shooting mode, a photometric image is captured with no exposure correction, that is, with an exposure correction value of ±0 EV. A recording image is captured by reflecting the exposure correction value appropriately set by the user for the EV value set by the auto exposure.

In the high-speed continuous shooting mode, on the other hand, the shooting interval per image becomes shorter and thus, as shown in FIG. 2B, image capturing is performed only once in the shooting period of one still image. In this case, one captured image is used as both a photometric image and a recording image. More specifically, the exposure for capturing the (N+1)-th still image is set based on the image data for the N-th still image.

In the normal continuous shooting mode, as described above, a photometric image is captured under the condition suitable for photometry (that is, the exposure correction value of ±0 EV) and thus, a proper EV value can be set. In the high-speed continuous shooting mode, on the other hand, an image (photometric and recording images) is captured by reflecting the exposure correction value set by the user (that is, the exposure correction of ±αEV), and the EV value is set based on the captured image. At this point, if the user makes an exposure correction with a large absolute value, the image to be captured is over exposed or underexposed so that an image with an inappropriate exposure may be recorded. If the EV value is calculated based on data of an image whose exposure is not appropriate, a problem is posed that a proper EV value is not calculated and an image of the exposure intended by the user cannot be obtained.

In order to solve such a problem, in the digital camera 100 according to the present embodiment, when the user sets an exposure correction value out of the predetermined range in a case where the high-speed continuous shooting mode is set and the auto exposure is set, control is exercised not to make auto exposure corrections during high-speed continuous shooting operation. Accordingly, a problem that an inappropriate EV value is automatically set when high-speed continuous shooting is executed with an exposure correction value with a large absolute value being set and an image of the exposure intended by the user cannot be obtained is solved. In the present embodiment, the predetermined range of the exposure correction is, for example, in the range from −3 EV to +3 EV both inclusive.

Figure 3:
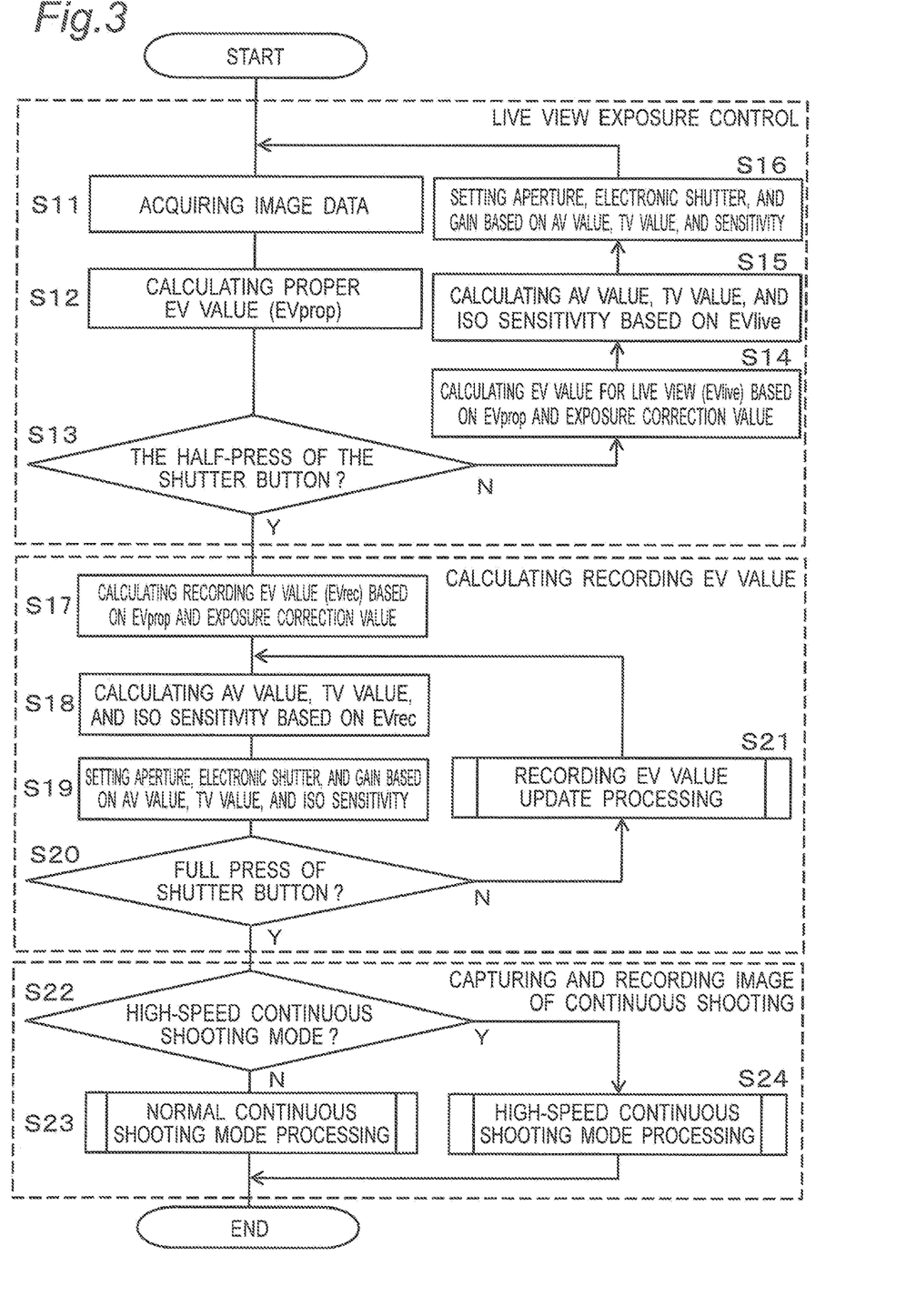
FIG. 3 is a flowchart showing main processing during continuous shooting in the digital camera according to the first embodiment.
Figure 4:
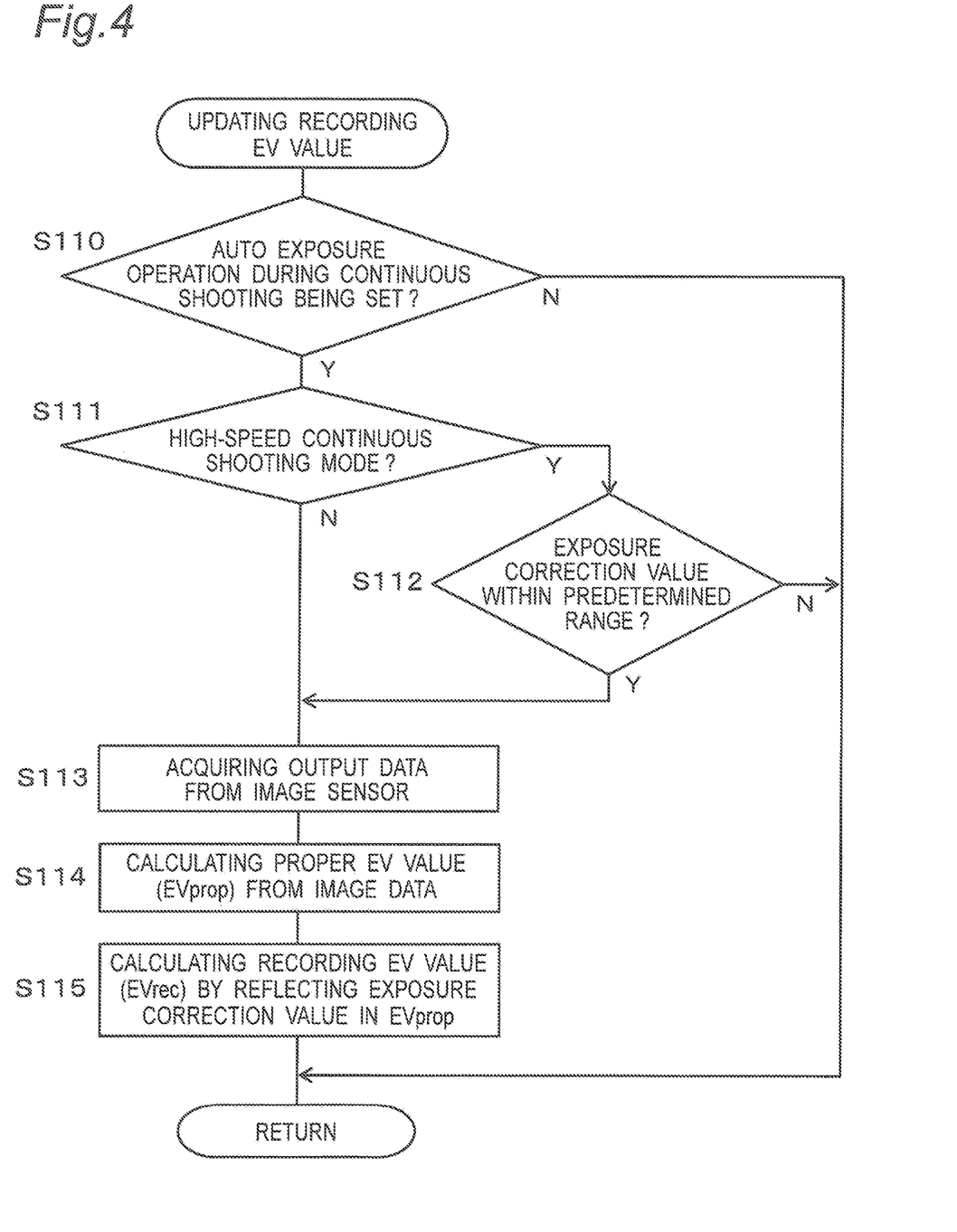
FIG. 4 is a flowchart showing recording EV value calculation processing in the flowchart shown in FIG. 3.
Figure 5:
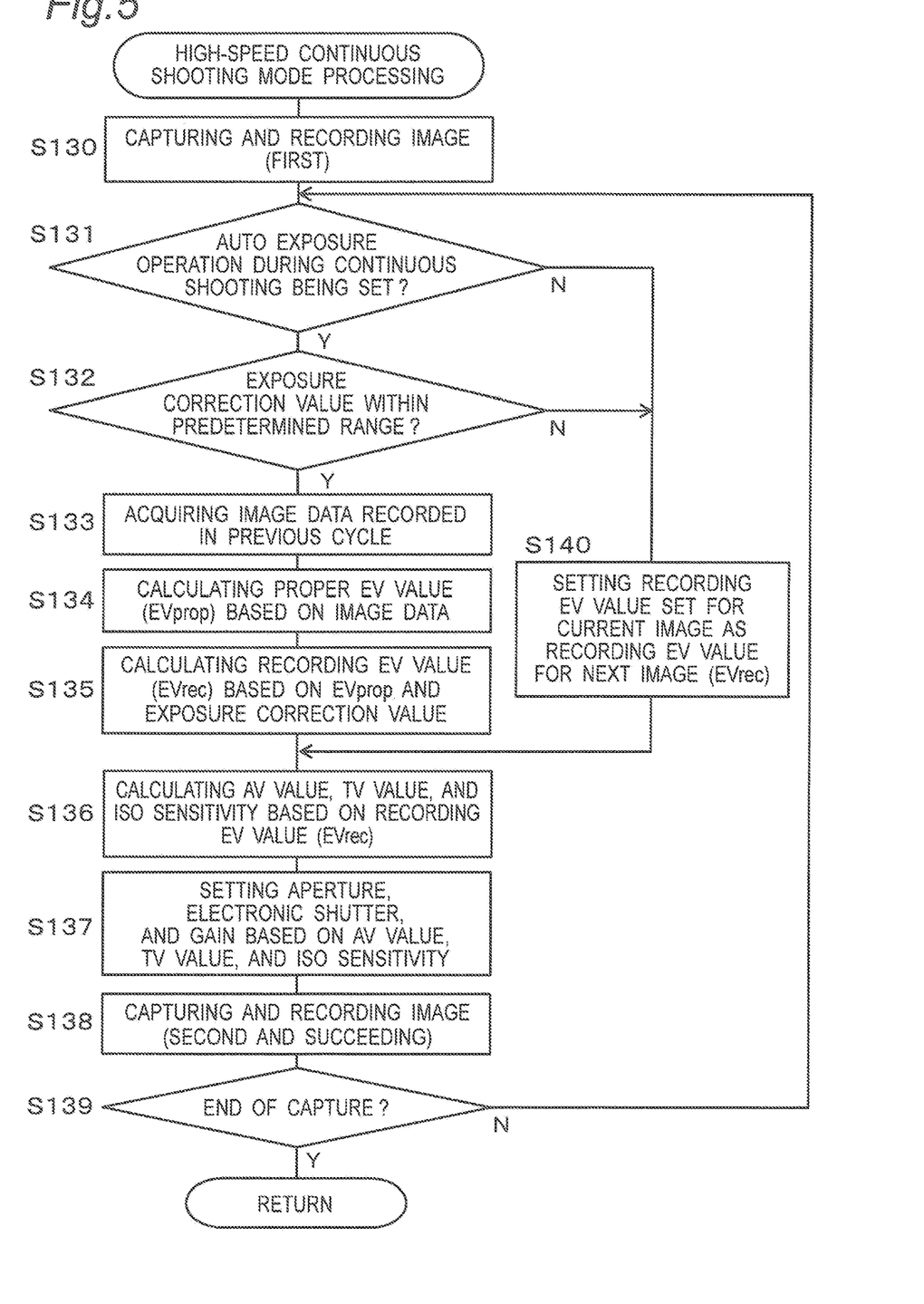
FIG. 5 is a flowchart showing high-speed continuous shooting mode processing in the flowchart shown in FIG. 3.

FIGS. 3 to 5 are flowcharts showing exposure settings and image recording processing during continuous shooting operation in the digital camera 100 according to the present embodiment. The processing shown in FIGS. 3 to 5 is performed by the controller 135 of the digital camera 100. The processing shown in FIG. 3 is started when the digital camera 100 is set to the continuous shooting mode and is in the shooting standby state, that is, in the state that the live view is being displayed.

In FIG. 3, the controller 135 first performs the live view exposure control (S11 to S16). More specifically, the controller 135 acquires image data (RGB data) generated by the image sensor 115 to determine the brightness of an image (subject) (S11). Then, the controller 135 recognizes the brightness based on the acquired image data and calculates a proper EV value (EVprop) (S12).

Thereafter, the controller 135 detects whether the shutter button is half-pressed by the user (S13).

When the half-press of the shutter button is not detected (NO in S13), the controller 135 calculates the EV value for live view (EVlive) by reflecting the exposure correction value set by the user in the proper EV value (EVprop) (S14). Here, when the exposure correction value set by the user exceeds the predetermined range (±3 EV), the controller 135 limits the exposure correction value to a value within a predetermined range, that is, the upper limit (+3 EV) or the lower limit (−3 EV). For example, when the exposure correction value set by the user is +4 EV, the exposure correction value is limited to +3 EV. Also, when the exposure correction value set by the user is −4 EV, the exposure correction value is limited to −3 EV. Then, the live view EV value is calculated based on the limited exposure correction value.

Thereafter, the controller 135 calculates an AV value (aperture value), a TV value (shutter speed), and ISO sensitivity (gain), which are used for the next image capturing, based on a program diagram using the EV value for live view (EVlive) (S15). Then, based on the calculated AV value, the calculated TV value, and the calculated ISO sensitivity, the controller 135 sets the aperture of the optical system, the timing of the electronic shutter, and the gain which are used for the next image capturing (S16) before returning to step S11.

On the other hand, when the half-press of the shutter button is detected (YES in S13), the controller 135 calculates a recording EV value (EVrec) (S17 to S21).

First, the controller 135 calculates the recording EV value (EVrec) by reflecting the exposure correction value set by the user in the proper EV value (EVprop) calculated in the live view exposure control (S17).

Then, the controller 135 calculates the AV value, the TV value, and the ISO sensitivity using the recording EV value (EVrec) (S18) and further sets the aperture, the timing of electronic shutter, and the gain, which are used for the next image capturing, based on the calculated AV value, the calculated TV value, and the calculated ISO sensitivity (S19).

Thereafter, the controller 135 detects whether the shutter button is fully pressed by the user (S20).

When the full press of the shutter button is not detected (NO in S20), the controller 135 performs the recording EV value update processing (S21) before returning to step S18.

FIG. 4 shows details of the recording EV value update processing (S21). In the recording EV value update processing (S21), the controller 135 first determines whether the digital camera 100 is set to perform an auto exposure operation during continuous shooting (S110). Here, the digital camera 100 can be set as to whether to perform the auto exposure operation during continuous shooting.

When the digital camera 100 is not set to perform the auto exposure operation during continuous shooting (NO in S110), the controller 135 terminates the processing in FIG. 4. In this case, the recording EV value (EVrec) is not updated. When the digital camera 100 is set to perform the auto exposure operation during continuous shooting (YES in S110), the controller 135 determines whether the digital camera 100 is set to the high-speed continuous shooting mode (S111).

When the digital camera 100 is not set to the high-speed continuous shooting mode (NO in S111), that is, set to the normal continuous shooting mode, the controller 135 acquires image data based on data from the image sensor 115 (S113). The controller 135 calculates a proper EV value (EVprop) from the image data (S114). Then, the controller 135 calculates the recording EV value (EVrec) by reflecting the exposure correction value in the proper EV value (EVprop) (S115). In this manner, the recording EV value (EVrec) is updated based on the image data.

When the digital camera 100 is set to the high-speed continuous shooting mode (YES in S111), the controller 135 determines whether the set exposure correction value is within a predetermined range (S112). The predetermined range is in the range from −3 EV to +3 EV both inclusive. When the exposure correction value is within the predetermined range (YES in S112), the controller 135 updates, as described above, the recording EV value (EVrec) (S113 to S115).

However, when the digital camera 100 is set to the high-speed continuous shooting mode (YES in S111) and the exposure correction value is out of the predetermined range (NO in S112), the controller 135 terminates the processing in FIG. 4 without performing steps S113 to S115. In this case, the recording EV value (EVrec) is not updated.

Thus, in the recording EV value update processing (S21), when the digital camera 100 is set to perform the auto exposure operation during continuous shooting, basically for each frame, the recording EV value (EVrec) is updated based on the data output from the image sensor and the exposure correction value. In the high-speed continuous shooting mode, however, when the exposure correction value is out of the predetermined range, the recording EV value (EVrec) is not updated. In this case, the recording EV value (EVrec) calculated based on the proper EV value (EVprop) set when the shutter button is half pressed is used.

Returning to FIG. 3, steps S18 to S21 are repeated until the full press of the shutter button is detected (S20). When the full press of the shutter button is detected (YES in S20), capturing and recording of continuous shot images is performed (S22 to S24).

More specifically, when the full press of the shutter button is detected (YES in S20), the controller 135 determines whether the digital camera 100 is set to the high-speed continuous shooting mode (S22).

When the digital camera 100 is not set to the high-speed continuous shooting mode (NO in S22), that is, set to the normal continuous shooting mode, the controller 135 performs normal continuous shooting mode processing (S23). In this processing, as shown in FIG. 2A, a photometric image is captured for each image (frame), and the recording EV value (EVrec) is calculated based on the image data of the photometric image and the exposure correction value. Then, based on the recording EV value (EVrec), the AV value, TV value, and ISO sensitivity are calculated and further, based on these values, the aperture, electronic shutter, and gain are set for image capturing. The digital camera 100 is controlled with these set parameters to capture a recording image. Then, the image data of the recording image is recorded in the memory card 142.

When the digital camera 100 is in the high-speed continuous shooting mode (YES in S22), the controller 135 performs high-speed continuous shooting mode processing (S24). Hereinafter, details of the high-speed continuous shooting mode processing will be described with reference to the flowchart in FIG. 5.

In the high-speed continuous shooting mode processing, the controller 135 first captures the first image of continuous shooting (S130). For the first image, an image is captured according to the settings of the aperture and the like which are set immediately before, in the recording EV value calculation processing (S17 to S20). Further, the controller 135 sets the recording EV value (EVrec) set for the first image to the recording EV value for the second image.

Next, the controller 135 determines whether the digital camera 100 is set to perform the auto exposure operation during continuous shooting (S131). When the digital camera 100 is not set to perform the auto exposure operation during continuous shooting (NO in S131), the controller 135 sets the recording EV value set for the first image (current image) to the recording EV value for the second image (next image) (S140).

On the other hand, when the digital camera 100 is set to perform the auto exposure operation during continuous shooting (YES in S131), the controller 135 determines whether the exposure correction value is within the predetermined range (from −3 EV to +3 EV both inclusive) (S132).

When the exposure correction value is within the predetermined range (YES in S132), the controller 135 acquires the image data of the image captured in the previous cycle (S133). The controller 135 calculates a proper EV value (EVprop) based on the acquired image data (S134). The controller 135 calculates the recording EV value (EVrec) by reflecting the exposure correction value in the proper EV value (EVprop) (S135).

On the other hand, when the exposure correction value is out of the predetermined range (NO in S132), the controller 135 sets the recording EV value set for the current image as the recording EV value for the next image (S140). Thus, when the exposure correction value is out of the predetermined range in the high-speed continuous shooting mode, the recording EV value (EVrec) set for the previous image is directly set also for the next image. That is, the recording EV value (EVrec) set immediately after half-pressing of the shutter button is continuously used during continuous shooting in the high-speed continuous shooting mode, and the recording EV value (EVrec) is not updated for each piece of image data acquired during continuous shooting. The exposure correction value set by the user is reflected in the recording EV value (EVrec) set immediately after half-pressing of the shutter button (see step S17 in FIG. 3) so that an image at the exposure intended by the user is recorded. Thus, when the exposure correction value is out of the predetermined range in the high-speed continuous shooting mode, the auto exposure control is not performed during continuous shooting operation.

Thereafter, the controller 135 calculates the AV value, TV value, and ISO sensitivity using the set recording EV value (EVrec) (S136). Then, based on the calculated AV value, the calculated TV value, and the calculated ISO sensitivity, the controller 135 sets the aperture, electronic shutter, and gain which are used for the next image (frame) (S137). The controller 135 captures the second image according to the aperture, electronic shutter, and gain set for the previous cycle and records the image data of the captured image in the memory card 142 (S138).

Hereinafter, the above steps S131 to S140 are similarly repeated until the continuous shooting is terminated (S139) so that the third and subsequent images are captured and image data thereof is recorded in the memory card 142. Continuous shooting is continued while the shutter button is fully pressed by the user. Therefore, by detecting the end of full pressing of the shutter button, the end of continuous shooting can be determined.

In the digital camera 100 according to the present embodiment, as described above, when high-speed continuous shooting is performed, even if the setting for auto exposure during continuous shooting is made, auto exposure control based on image data captured during continuous shooting is not performed when the exposure correction value set by the user is out of the predetermined range (NO in S132, S140). In this case, the exposure is set based on the EV value that is set immediately after half-pressing of the shutter button and in which the exposure correction value is reflected. Accordingly, it is possible to inhibit inappropriate exposure from being set by auto exposure when an exposure correction value out of the predetermined range is set so that capturing of an image of the exposure unintended by the user can be suppressed. On the other hand, when the exposure correction value set by the user is within the predetermined range, auto exposure in high-speed continuous shooting is performed. In this case, an image can be captured with exposure according to user's preference.

[1-3. Effects, Etc.]

As described above, the digital camera 100 according to the present embodiment is an imaging apparatus having an auto exposure function for automatically setting the exposure and capable of continuous shooting. The digital camera 100 includes the image sensor 115 (an example of an imager) that captures an image of a subject with exposure set and generates image data, the operation unit 150 (an example of an operator) that sets an exposure correction value for correcting the exposure set by the auto exposure function and a continuous shooting mode including the normal shooting mode (an example of the first continuous shooting mode) and the high-speed continuous shooting mode (an example of the second continuous shooting mode) for performing continuous shooting faster than the normal continuous shooting mode, and the controller 135 that performs auto exposure control for implementing an auto exposure function.

When the high-speed continuous shooting mode is set in the operation unit 150, the controller 135 determines whether the exposure correction value is within a predetermined range (for example, from −3 EV to +3 EV both inclusive) (S132). When it is determined that the exposure correction value is within the predetermined range, the controller 135 performs auto exposure control during continuous shooting operation in the high-speed continuous shooting mode (S134 to S135). When it is determined that the exposure correction value is not within the predetermined range, the controller 135 does not perform the auto exposure control during continuous shooting operation in the second continuous shooting mode (S140).

The present disclosure provides an imaging apparatus that reduces the generation of an image of an exposure unintended by a user during continuous shooting. In the high-speed continuous shooting mode, as described above, auto exposure control is performed when the exposure correction value is within the predetermined range, but auto exposure control is not performed when the exposure correction value is out of the predetermined range. Accordingly, when the exposure correction value is out of the predetermined range, it is possible to prevent execution of inappropriate auto exposure control caused by failure to obtain an image of appropriate exposure for brightness determination, and capturing of an image of exposure unintended by the user can be prevented. On the other hand, when the exposure correction value is within the predetermined range, an image of the exposure intended by the user can be captured by performing the auto exposure control.

Other Embodiments

As described above, the first embodiment has been described as an example of the technology disclosed in the present application. However, the technology in the present disclosure is not limited thereto, and can also be applied to embodiments in which changes, substitutions, additions, omissions or the like are made as appropriate. In addition, it is also possible to combine respective components described in the first embodiment to form a new embodiment.

In the above embodiment, an example in which the digital camera 100, which is an example of the imaging apparatus, has two continuous shooting modes, that is, a normal continuous shooting mode and a high-speed continuous shooting mode has been described, but the imaging apparatus may have three or more continuous shooting modes with different continuous shooting speeds. In such a case, as shown in FIG. 2B, only a recording image is captured for one image, the brightness of the image is discriminated by using data of the recording image, and the above exposure control can be applied to the continuous shooting mode in which the auto exposure control is performed.

In the above embodiment, exposure control during continuous shooting operation for generating a plurality of pieces of still image data has been described, but the above exposure control can also be applied to a moving image shooting operation. That is, in the moving image shooting operation, as shown in FIG. 2B, only a recording image is captured for one frame image, the brightness of the image is discriminated by using data of the recording image, and the above exposure control can be similarly applied when the auto exposure control is performed.

In the above embodiment, a digital camera has been described as an example of the imaging apparatus. However, the imaging apparatus is not limited to the digital camera and may be any apparatus having a continuous shooting function such as a video camera, a smartphone or the like.

As described above, an embodiment has been described as an example of the technology in the present disclosure. To that end, the accompanying drawings and detailed description have been provided.

Therefore, among components described in the accompanying drawings and detailed description, not only essential components for solving the problem, but also components that are not essential for solving the problem are included to illustrate the technology. For this reason, the fact that these non-essential components are described in the accompanying drawings or detailed description should not immediately lead to the recognition that these non-essential components are essential.

Further, the above embodiment is provided to illustrate the technology in the present disclosure and thus, it is possible to make various changes, substitutions, additions, omissions, or the like within the scope of claims or equivalents thereof.

The present disclosure is useful for an imaging apparatus having an auto exposure function for automatically setting exposure and capable of continuous shooting.

Obviously, numerous modifications and variations of the present invention are possible in light of the above teachings. It is therefore to be understood that within the scope of the appended claims, the invention may be practiced otherwise than as specifically described herein.

What is claimed is:

1. An imaging apparatus having an auto exposure function for automatically setting an exposure value, the imaging apparatus comprising:
    an imager to shoot a subject with exposure set and to generate image data;
    an operator to set:
        an exposure correction value that is combined with the exposure value set by the auto exposure function to correct the exposure value set by the auto exposure function; and
        a continuous shooting mode including:
            a first continuous shooting mode and a second continuous shooting mode in which continuous shooting is performed at a higher speed than in the first continuous shooting mode; and a controller configured to:
- perform auto exposure control by implementing the auto exposure function to automatically set the exposure value based on brightness,
- receive the exposure correction value set by a user,
- determine an image capture exposure value by combining the exposure value set by the auto exposure function and the exposure correction value;
- cause the imager to shoot the subject with the image capture exposure value to generate the image data;
- when the second continuous shooting mode is set in the operator, determine whether the exposure correction value is within a predetermined range,
- perform the auto exposure control during continuous shooting operation in the second continuous shooting mode when it is determined that the exposure correction value is within the predetermined range, and
- not perform the auto exposure control during the continuous shooting operation in the second continuous shooting mode when it is determined that the exposure correction value is not within the predetermined range.

2. The imaging apparatus according to claim 1, wherein, in the second continuous shooting mode, the controller is additionally configured to set the exposure value for capturing an (N+1)-th image based on the brightness of an N-th image in the continuous shooting.

3. The imaging apparatus according to claim 2, wherein,
in the first continuous shooting mode, a photometric image and a recording image are each captured for the N-th image in the continuous shooting, and the controller is additionally configured to set the exposure value for capturing the recording image for the N-th image based on the brightness of the photometric image for the N-th image.

* * * * *